May 27, 1958 F. J. MILLER 2,836,002
AUTOMATIC SINKER
Filed Oct. 1, 1956
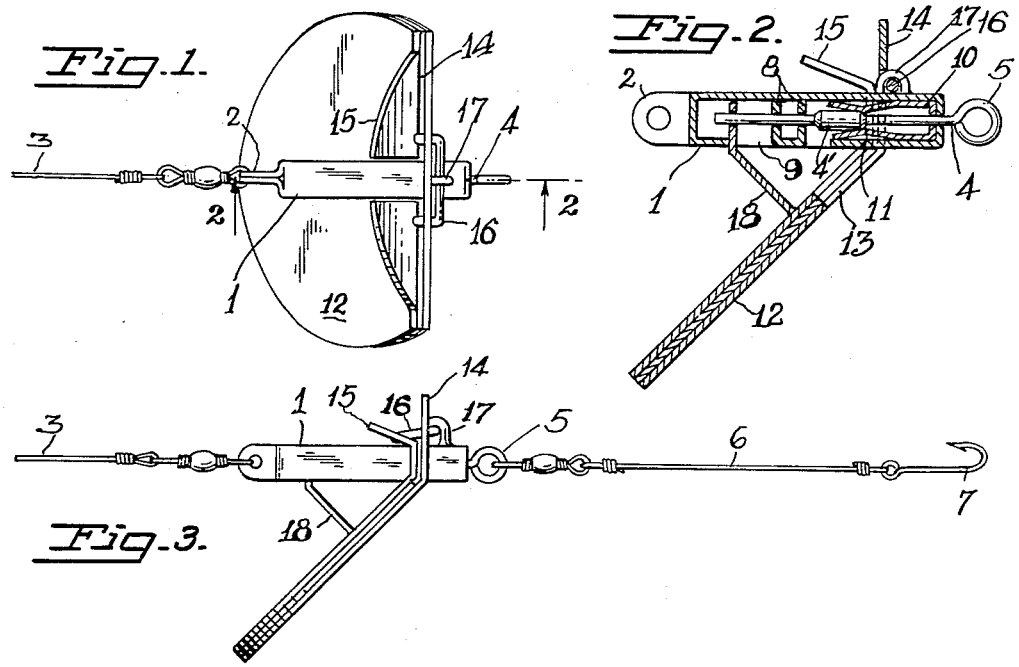
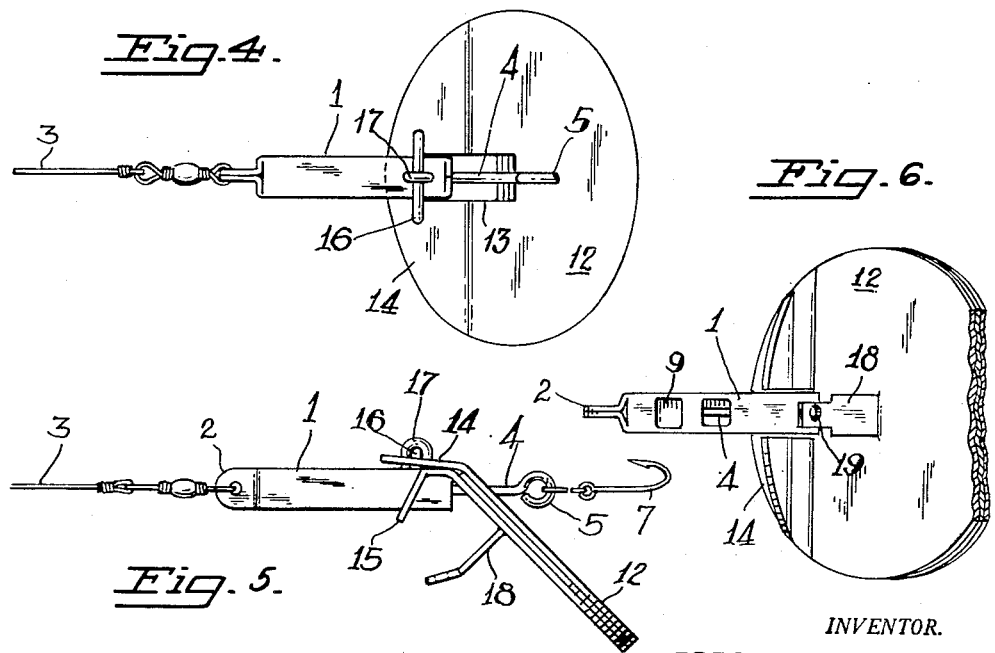
INVENTOR.
FRED J. MILLER
BY
J. E. Trabucco
ATTORNEY

United States Patent Office 2,836,002
Patented May 27, 1958

2,836,002

AUTOMATIC SINKER

Fred J. Miller, San Francisco, Calif.

Application October 1, 1956, Serial No. 613,015

1 Claim. (Cl. 43—43.13)

This invention relates to an improved sinker for use with fishing tackle.

In trolling it is usually desirable to have the fish hook and lure drawn through the water at an appreciable depth, below the surface, and it is desirable also, when a fish is hooked, to eliminate or lessen the force of gravity exerted by the weighted sinker. Better fishing results can ordinarily be expected by having the fish hook and lure maintained at a depth well below the surface of the water, and when a fish is hooked the fishing enjoyment in playing the fish may be increased by reducing or eliminating the dead weight of the sinker. Sinkers of the kind now commonly used to carry a connected hook and lure downwardly in the water are sometimes equipped with releasable means which automatically disconnects them from the fishing line when a fish is hooked, but one of the disadvantages incident to the use of such equipment is that the released sinker is not ordinarily recoverable. These and the non-releasable types of sinkers now in use are not entirely satisfactory for these and other reasons.

The present invention provides an automatic sinker which functions in a novel manner to increase the depth of the connected fish hook when trolling and which is adapted to counteract or lessen the force of gravity thereon when a fish is hooked. My improved sinker embodies an automatically adjustable member which when trolling is adapted to be actuated downwardly by the pressure of the water against it, and when a fish is hooked this same member is released and allowed to automatically assume another position wherein the pressure of the water against it exerts an upward force thereon that counteracts and lessens the force of gravity.

An object of the present invention is to provide an improved automatic sinker having an adjustable plate which is normally positioned at an angle whereby the water pressure against it when trolling will cause it and a connected fish hook to be deflected downwardly, and the said adjustable plate being adapted to assume another position when a fish is hooked whereby the water pressure against it will cause it and the said hook to be deflected upwardly and thereby overcome the force of gravity.

Other and further objects of my invention will be pointed out hereinafter, or will be indicated in the appended claim or will be obvious to one skilled in the art upon an understanding of the present disclosure. For the purpose of this application I have elected to show herein certain forms and details of an automatic sinker embodying my invention; it is to be understood, however, that the embodiment of my invention herein shown and described is for purposes of illustration only and that therefore it is not to be regarded as exhaustive of the variations of the invention.

In the accompanying drawing:

Fig. 1 is a top plan view of an automatic sinker embodying my invention, showing the plate member held in a certain position;

Fig. 2 is a sectional view taken on the line 2—2 of Fig. 1;

Fig. 3 is a side elevational view, showing the plate member held in this same position;

Fig. 4 is a top plan view, showing the position of the plate member after it has been released;

Fig. 5 is a side elevational view showing the sinker in its released position; and Fig. 6 is a bottom view of the sinker, showing parts of the plate member broken away and in section.

Referring to the drawing the numeral 1 designates an elongated casing of substantially rectangular shape in cross section. One end of the casing is formed with a projecting member 2 having an opening for the attachment of a fishing line 3. The opposite end of the casing has a suitable small opening through which a rod 4 slidably extends. The rod is mounted for reciprocating movement, and is formed at one end with an eye 5 for securing a leader 6 which carries one or more hooks 7. The opposite end of the rod is adapted to extend through aligned openings formed in two spaced parallel walls or partitions 8 which extend transversely across the interior of the casing 1. The transverse walls 8 are preferably formed by cutting two tongues from the bottom side of the casing and bending them upwardly to parallel positions, and when said tongues have thus been arranged to provide the transverse walls 8 there are formed two openings in the bottom side of the said casing, one of said openings being designated by the numeral 9. The transveres walls 8 provide bearing means for slidably supporting the rod 4 in an axial position with respect to the casing.

Mounted in the casing 1 is a substantially U-shaped member 10 made from a suitable rust-proof resilient metal, having an opening in its central end portion through which the rod 4 slidably extends. The member 10 is secured against displacement in the casing, and it has spaced resilient legs which are formed with inwardly protruding opposed portions 11. The rod 4 is formed with an enlarged section 4' which is so arranged that when the rod is in its rearward position with its inwardly disposed end extending forwardly above the opening 9 in the bottom side of the casing as shown in Fig. 2, the inwardly protruding portions 11 of the U-shaped member 10 engage with the forward end of the said enlarged section 4' and thereby normally prevent the movement of the said rod in a forward direction toward the fish hook. The opposed legs of the U-shaped member 10 being resilient are adapted to move apart and permit the release of the inwardly protruding portions 11 from engagement with the forward end of the enlarged section 4' of the rod 4 when a predetermined forward pull is given to the said rod, as when a fish of sufficient size is caught on the hook 7. When such a pull in a forward direction is given to the rod the enlarged section 4' will overcome the inward spring tension of the legs and slide forwardly against the inwardly protruding portions 11 of the legs, thereby causing the rear end portion of the rod to move forwardly sufficiently to release a restraining member which it then holds against movement, as will be presently described. The enlarged section 4' of the rod 4 being larger in diameter than the opening in the central portion of the U-shaped member 10 will not become detached from the casing when it is reciprocated to its forward position.

Mounted on the casing 1 is a deflector plate 12 which is formed with a substantially rectangular opening 13 through which the said plate movably extends. The plate 12 is preferably, although not necessarily, made in three sections which are secured together by welding or other suitable means to form a unitary plate structure. The upper portion of the plate 12 is bent rearwardly as at 14 to form a top portion or projecting member which is adapted to engage with the upper side of the casing to prevent the movement of the plate beyond a certain position after it is released as will be later described. The plate 12 is also formed with a forwardly bent portion 15 which normally underlies the top portion 14, such portion 15 having a slot therein through which the casing 1 is adapted to move. The plate 12 is pivotally suspended from and supported by the casing 1. The top portion 14 of the plate 12 is secured to a bail 16 and such bail extends through an eye member 17 secured to the upper side of the casing 1 near the forward end thereof. Thus the plate is pivotally suspended from the casing with the preponderance of the weight of such plate distributed well below the casing. Secured to and projecting from the rear side of the plate 12 is a restraining member 18 having an opening 19 at its upper or rear end through which the rear end portion of the rod 4 is adapted to extend. The restraining member 18 is arranged at an angle of approximately ninety degrees with respect to the plate 12, except for the tip end thereof which is bent slightly toward the upper end of the plate. The tip end of the restraining member 18 is adapted to project through the opening 9 in the lower side of the casing, and when so positioned the rear end of the rod 4 may be extended through the opening 19 of the restraining member by pushing the said rod rearwardly against the inward pressure of the inwardly protruding portions 11 of the U-shaped member 10. When the rod has been extended through the opening 19 of the restraining member 18, the forward end of the enlarged section 4' of such rod will be disposed rearwardly of and in contact with the rear end of the inwardly protruding portions 11, and the said rod will then be releasably held with its rear end extended through the opening 19. The restraining member 18 is of such a length and is so arranged with respect to the plate 12 that the plate is inclined forwardly when the restraining member 18 is engaged by the rod 4, as shown in Figs. 2 and 3. In trolling when the sinker and the connected hook 7 are drawn rearwardly through the water the plate 12 will be carried in a forwardly inclined position and at an acute angle with respect to the longitudinal axis of the casing 1. As the plate is drawn forwardly the water pressure against it will cause it to be deflected downwardly, thereby causing it and the connected fish hook 7 to rapidly submerge and stay in a submerged position well below the surface of the water while the normal trolling operation continues. The plate being suspended from its upper tip end portion will normally retain a depending non-rotative position during the normal operation of the fishing equipment when trolling.

A fish caught on the hook 7 if above a certain weight will exert a sufficient pull in a forward direction on the rod 4 to effect the release of the forward end of the enlarged section 4' of the said rod from engagement with the inwardly protruding portions 11 of the U-shaped member 10. In such an event the rod will be pulled forwardly with respect to the casing to a position whereby the restraining member 18 is released. Upon the release of the restraining member 18 from the rod the plate 12 is free to swing forwardly about the bail 16 as a pivot. Thus, as the forward movement of the sinker and the fish hook continues the water pressure against the plate causes the latter to swing forwardly until the top portion 14 of the plate engages with the upper side of the casing 1. The further forward pivotal movement of the plate is thereby discontinued and the plate will thereupon assume and retain a rearwardly inclined position, providing the line is reeled in or carried rearwardly at a sufficient speed to maintain a predetermined water pressure against the plate. When the plate is in a rearwardly inclined released position, sufficient water pressure against it will tend to deflect it upwardly, thereby assisting in the bringing of the hooked fish to the surface of the water.

The plate is adapted to swing through an angle of about ninety degrees from its normal trolling position to the position it assumes after it is released.

So that the present invention could be better described and understood, the casing, line and leader have been shown on the drawings in a substantially horizontal aligned position, but in actual practice these parts of the fishing tackle are somewhat more inclined when they are being drawn through the water, and similarly the various parts of the sinker also assume somewhat different relative positions.

What I claim is:

In an automatic sinker, an elongated casing having line connecting means at one end, an opening in its other end and a second opening through the side thereof, a reciprocating rod extending through the end opening in the casing and having line connecting means located exteriorly of the casing, the plate having an opening through which the casing extends and a plate pivotally supported on the casing, the said plate being adapted to swing from a forwardly inclined position to a rearwardly inclined position, a projecting member carried by the plate and arranged to engage with the casing when the plate swings to a rearwardly inclined position, a restraining member secured to the plate and having an apertured end portion arranged to extend into the casing through the second opening when the plate is in its forwardly inclined position, the said rod when in one extreme of its reciprocatory movement being arranged to extend through the aperture of the restraining member when the said apertured end is positioned in the casing, and means carried in the casing for releasably holding the rod in a position extending through the aperture of the restraining member, the said means being releasable from the rod when a predetermined pull is exerted thereon, whereby the restraining member is released from the rod and the plate is free to swing to a rearwardly inclined position.

References Cited in the file of this patent

UNITED STATES PATENTS

| 1,489,421 | Bond | Apr. 8, 1924 |
| 2,322,536 | Miller | June 22, 1943 |
| 2,716,832 | Minnie | Sept. 6, 1955 |
| 2,755,592 | Bocchino | July 24, 1956 |